United States Patent [19]

Yamamoto

[11] 4,275,770

[45] Jun. 30, 1981

[54] WEAR RESISTANT RUBBER HOSE

[75] Inventor: Megumi Yamamoto, Yokohama, Japan

[73] Assignee: Bridgestone Tire Co., Ltd., Kyobashi, Japan

[21] Appl. No.: 38,959

[22] Filed: May 14, 1979

Related U.S. Application Data

[62] Division of Ser. No. 851,916, Nov. 16, 1977, Pat. No. 4,212,328.

[30] Foreign Application Priority Data

Feb. 18, 1977 [JP] Japan .......................... 52-17973[U]
Oct. 17, 1977 [JP] Japan ......................... 52-138052[U]

[51] Int. Cl.³ ............................................. F16L 11/08
[52] U.S. Cl. ........................................ 138/133; 138/132; 138/138

[58] Field of Search .................. 138/36, 133, 138, 131, 138/134, 153, 139, 172, 174; 166/242; 175/321; 245/4, 5, 9

[56] References Cited

U.S. PATENT DOCUMENTS

| | | | |
|---|---|---|---|
| 947,046 | 1/1910 | Sugg | 138/138 |
| 1,068,491 | 7/1913 | Eynon | 138/133 |
| 1,162,463 | 11/1915 | Doppenschmitt | 245/4 |
| 2,173,359 | 9/1939 | Freedlander | 138/138 |

*Primary Examiner*—James E. Bryant, III
*Attorney, Agent, or Firm*—Sughrue, Rothwell, Mion, Zinn and Macpeak

[57] ABSTRACT

A wear resistant rubber hose for transferring fluid containing abrasive material such as crushed stone, coral, etc. comprises an inner surface rubber and a continuous chainshaped filling body having a rigidity which is considerably higher than that of the inner surface rubber embedded directly inside the inner peripheral surface thereof.

3 Claims, 4 Drawing Figures

WEAR RESISTANT RUBBER HOSE

This is a division of application Ser. No. 851,916, filed Nov. 16, 1977, now U.S. Pat. No. 4,212,328.

BACKGROUND OF THE INVENTION (1) Field of the Invention

This invention relates to wear resistant rubber hoses and more particularly to a wear resistant rubber hose for transferring fluid containing abrasive material such as crushed stone, coral, etc.

(2) Description of the Prior Art

In transferring mud dug from the sea-bed together with the sea water by means of a conventional rubber hose, sharp corners of the crushed stone or coral mixed in the mud strike against the inner surface of the rubber hose, thus inducing the premature tear failure thereof and hence deteriorating its durability.

SUMMARY OF THE INVENTION

An object of the invention, therefore, is to provide a wear resistant rubber hose which can eliminate the above described drawback which has been encountered with the prior art technique, that is, which has a significantly high durability for a total period in the use of rubber hose.

A feature of the invention is the provision in a wear resistant rubber hose comprising an inner surface rubber, a reinforcing layer for covering said inner surface rubber and an outer cover rubber for covering said reinforcing layer, of the improvement comprising a filling body having a rigidity which is considerably higher than that of said inner surface rubber and embedded directly inside the inner peripheral surface thereof.

The filling body may be composed of hard particles, preferably a steel chain. The hard particles can improve the wear resistant property of the inner periphery of the inner surface rubber. But, if the inner surface of the rubber becomes damaged to expose the hard particles, they tend to be easily dug out. As a result, the inner surface rubber becomes significantly worn, particularly after a given period in the use of the rubber hose.

In accordance with the invention, in order to eliminate such drawback, the filling body is composed of a chain-shaped continuous body wound around a center axis of the hose along the inner periphery thereof. Alternatively, the filling body may be composed of a chain consisting of a series of links connected one to another and each formed of an open ring whose opposed ends form a gap therebetween. The chain may also consist of a series of links connected one to another and each formed of a closed ring and connected to adjacent links with a gap formed therebetween.

DESCRIPTION OF THE DRAWINGS

The invention will now be described in greater detail with reference to the accompanying drawings, wherein.

DETAILED DESCRIPTION OF THE INVENTION

Figure 1:
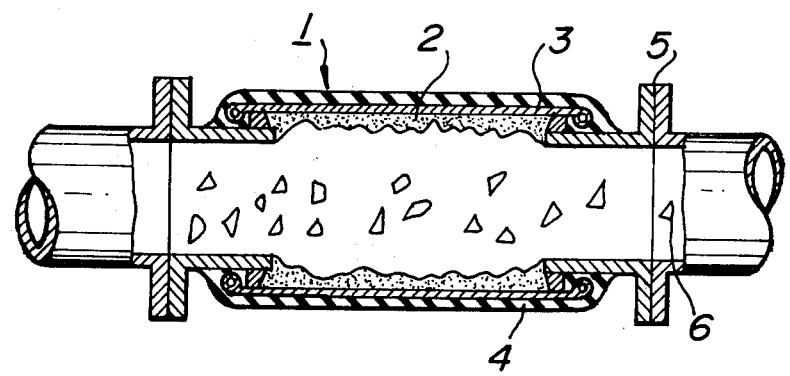
FIG. 1 is a cross-sectional view of a conventional rubber hose illustrating the mode of gradually damaging its inner surface rubber by an abrasive fluid.

In FIG. 1 is shown a conventional rubber hose 1. Such rubber hose 1 usually has an inner diameter of the order of 760 mm and a length of the order of 1.7 m and comprises an inner surface rubber 2 having a thickness of about 80 mm, a reinforcing layer 3 covering the outer periphery of the inner surface rubber 2 and an outer cover rubber 4 covering the reinforcing layer 3 and provided at its both ends with a metal flange 5 made integral therewith. If such conventional rubber hose is used for transferring mud together with sea water, abrasive material 6 contained in the fluid is struck against the inner surface rubber 2, thereby damaging it as shown by the undulations in FIG. 1.

Figure 2:
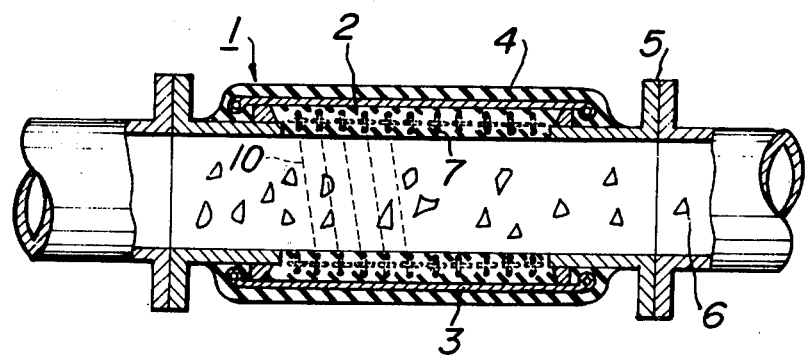
FIG. 2 is a cross-sectional view of one embodiment of a wear resistant rubber hose according to the invention.

In FIG. 2 is shown one embodiment of a wear resistant rubber hose according to the invention. In the present embodiment, a rubber hose 1 is provided directly inside of the inner surface rubber 2 with a number of spaced apart chain-shaped continuous bodies 7. These chain-shaped continuous bodies 7 are arranged side by side along the inner periphery of the inner surface rubber 2 and wound around the center axis of the rubber hose 1 and embedded therein. It is preferable to make use of a chain 7 consisting of a series of links connected one to another and wound helically around the center axis of the rubber hose 1, as schematically shown by broken lines 10 in FIG. 2. The inner surface rubber 2 is covered with a reinforcing layer 3 which can withstand the internal pressure applied to the rubber hose 1 and the reinforcing layer 3 is covered with an outer cover rubber 4 having a thickness of the order of 5 mm.

In the rubber hose constructed as above described according to the invention, in its initial condition shown in FIG. 2, the thickness of the inner surface rubber 2 is large and the steel chain 7 constituting the filling body functions to reinforce the inner surface rubber 2 and hence improve the initial durability thereof against the abrasive fluid.

If the inner surface rubber 2 becomes worn to reduce its thickness, the steel chain 7 is exposed out of the inner periphery of the inner surface rubber 2 and brought into contact with the fluid being transferred or the abrasive material such as crushed stones, coral, etc. contained therein. As a result, it is possible to effectively prevent any further wear of the inner surface rubber 2 and hence improve the durability of the rubber hose after a given period in the use thereof.

Figure 3A:
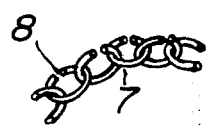
FIG. 3a is a partial perspective view of a preferred embodiment of a filling body used in the rubber hose shown in FIG. 2.

In the case of using as the filling body the steel chain 7 shown in FIG. 3a, the steel chain 7 functions to particularly increase the resistance against the digging action due to the abrasive fluid and hence further improve the durability of the rubber hose. That is, if the internal pressure of the fluid being transferred is exerted on the inner surface rubber 2, a local stress is produced in that part of the inner surface rubber 2 which is bound by the steel chain 7. As a result, the chain 7 formed of the C-shaped open rings becomes resiliently deformed to effectively alleviate the local stress concentrated into the inner surface rubber 2.

Figure 3B:
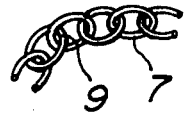
FIG. 3b is a partial perspective view of another preferred embodiment of a filling body used in the rubber hose shown in FIG. 2.

The steel chain 7 shown in FIG. 3b also functions to particularly increase the resistance against the digging tion due to the abrasive fluid and hence further improve the durability of the rubber hose.

That is, if the internal pressure of the fluid being transferred is exerted on the inner surface rubber 2, a local stress is produced in that part of the inner surface rubber 2 which is bound by the steel chain 7. As a result, the chain 7 formed of closed links connected with each other through the gaps 9 functions to compress and deform the rubber in the gaps 9 and hence absorb and effectively alleviate the local stress concentrated into the inner surface rubber 2.

As stated hereinbefore, the rubber hose for transferring fluid containing abrasive material according to the invention can significantly improve the wear resistant property of the inner surface rubber thereof and hence effectively improve the durability of the rubber hose.

What is claimed is:

1. In a wear resistant rubber hose having a central longitudinal axis and comprising an inner layer of surface rubber, an intermediate reinforcing layer surrounding said inner layer of surface rubber and an outer cover rubber layer surrounding said reinforcing layer, the improvements comprising: a continuous chain string having a ridigity considerably higher than that of said inner layer of surface rubber completely embedded inside the inner layer of surface rubber, said chain string being helically wound around the central longitudinal axis of the hose and comprising a plurality of individual planar links serially connected to one another and positionally disposed within the inner layer of surface rubber such that the planes of every other link are substantially parallel to the central longitudinal hose axis while the planes of the alternate, remaining links are substantially perpendicular to the central longitudinal hose axis, and wherein laterally adjacent links in the helically wound chain string are spaced from one another in the direction of the central longitudinal hose axis.

2. The rubber hose according to claim 1, wherein said links are each formed of a C-shaped open ring having opposed ends with a gap formed therebetween.

3. The rubber hose according to claim 1, wherein said links are each formed of a closed ring and connected to adjacent links with a gap formed therebetween.

* * * * *